(12) United States Patent
Ezell

(10) Patent No.: US 9,544,340 B2
(45) Date of Patent: Jan. 10, 2017

(54) APPLICATION PROGRAMMING INTERFACE ENABLING COMMUNICATION FEATURES FOR DIFFERENT COMMUNICATION PROTOCOLS

(71) Applicant: Avaya Inc., Basking Ridge, NJ (US)

(72) Inventor: Joel M. Ezell, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 406 days.

(21) Appl. No.: 14/054,286

(22) Filed: Oct. 15, 2013

(65) Prior Publication Data

US 2014/0280987 A1    Sep. 18, 2014

Related U.S. Application Data

(60) Provisional application No. 61/798,865, filed on Mar. 15, 2013.

(51) Int. Cl.
*G06F 15/16* (2006.01)
*H04L 29/06* (2006.01)

(52) U.S. Cl.
CPC ......... *H04L 65/1069* (2013.01); *H04L 65/103* (2013.01); *H04L 65/105* (2013.01); *H04L 65/1006* (2013.01); *H04L 65/1009* (2013.01); *H04L 65/1016* (2013.01); *H04L 65/1063* (2013.01)

(58) Field of Classification Search
USPC ................................ 709/204, 205, 227, 230
See application file for complete search history.

(56) References Cited

U.S. PATENT DOCUMENTS

| | | | |
|---|---|---|---|
| 7,269,160 B1 | 9/2007 | Friedman et al. | |
| 7,486,949 B2 | 2/2009 | Ignatin | |
| 8,644,817 B1 | 2/2014 | Ezell et al. | |
| 8,910,245 B2 * | 12/2014 | Kondamuru | H04L 29/12066 709/221 |
| 2003/0032456 A1 * | 2/2003 | Mumick | H04M 3/4938 455/566 |
| 2004/0081159 A1 | 4/2004 | Pan et al. | |
| 2005/0282541 A1 | 12/2005 | Iizuka et al. | |
| 2006/0089169 A1 | 4/2006 | Tsao et al. | |
| 2007/0140157 A1 | 6/2007 | Fu et al. | |

(Continued)

FOREIGN PATENT DOCUMENTS

| | | |
|---|---|---|
| EP | 2220815 | 8/2010 |
| EP | 2299675 | 3/2011 |

(Continued)

OTHER PUBLICATIONS

U.S. Appl. No. 13/897,349, filed May 17, 2013, Ezell.

(Continued)

*Primary Examiner* — Liangche A Wang
(74) *Attorney, Agent, or Firm* — Sheridan Ross P.C.

(57) ABSTRACT

Systems and methods are described for enabling browser-to-phone and browser-to-browser communications to be enhanced with enterprise communication features. Specifically, a Collaboration Environment is disclosed with the ability to interface a browser with an enterprise communication network. The Collaboration Environment is exposed to browsers via a media server and/or websocket and is enabled to communicate with the browsers via a purpose-built library.

19 Claims, 9 Drawing Sheets

(56) References Cited

U.S. PATENT DOCUMENTS

| | | | |
|---|---|---|---|
| 2007/0226795 A1* | 9/2007 | Conti | G06F 21/74 726/22 |
| 2008/0052377 A1 | 2/2008 | Light | |
| 2008/0084859 A1 | 4/2008 | Sullivan | |
| 2009/0003316 A1 | 1/2009 | Lee et al. | |
| 2009/0111472 A1 | 4/2009 | Promenzio et al. | |
| 2010/0031335 A1 | 2/2010 | Handler | |
| 2010/0105379 A1 | 4/2010 | Bonner et al. | |
| 2011/0289203 A1 | 11/2011 | Braudes et al. | |
| 2011/0289219 A1 | 11/2011 | Braudes et al. | |
| 2013/0303007 A1 | 11/2013 | Kim et al. | |
| 2014/0126714 A1 | 5/2014 | Sayko | |
| 2014/0280995 A1 | 9/2014 | Ezell | |
| 2015/0199161 A1 | 7/2015 | Gutnik et al. | |

FOREIGN PATENT DOCUMENTS

| | | |
|---|---|---|
| GB | 2480550 | 11/2011 |
| KR | 10-2005-0092615 | 9/2005 |
| KR | 10-2006-0082127 | 7/2006 |
| KR | 10-2007-0027427 | 3/2007 |
| WO | WO 2014/060008 | 4/2014 |

OTHER PUBLICATIONS

Official Action with English Translation for Korea Patent Application No. 2013-0075771, dated Apr. 23, 2014 8 pages.

Notice of Allowance with English Translation for Korea Patent Application No. 10-2013-0075771, mailed Jul. 23, 2014 3 pages.

Combined Search and Examination Report for United Kingdom Patent Application No. GB1322999.2, dated Jul. 4, 2014 6.

Official Action for U.S. Appl. No. 13/627,750, mailed Dec. 10, 2012 19 pages.

Official Action for U.S. Appl. No. 13/627,750, mailed Apr. 25, 2013 24 pages.

Notice of Allowance for U.S. Appl. No. 13/627,750, mailed Sep. 18, 2013 13 pages.

Official Action for U.S. Appl. No. 13/897,349, mailed Dec. 4, 2014 23 pages.

Combined Search and Examination Report for United Kingdom Patent Application No. GB1512416.7, dated Sep. 1, 2015 5 pages.

Official Action for U.S. Appl. No. 13/897,349, mailed Jun. 18, 2015 24 pages.

Notice of Allowance for U.S. Appl. No. 13/897,349, mailed Oct. 13, 2015 8 pages.

Official Action for U.S. Appl. No. 14/054,275, mailed Dec. 2, 2015 4 pages.

Official Action for U.S. Appl. No. 14/054,275, mailed May 11, 2016 13 pages.

* cited by examiner

APPLICATION PROGRAMMING INTERFACE ENABLING COMMUNICATION FEATURES FOR DIFFERENT COMMUNICATION PROTOCOLS

CROSS REFERENCE TO RELATED APPLICATIONS

This application claims the benefit of U.S. Provisional Application No. 61/798,865, filed Mar. 15, 2013, the entire disclosure of which is hereby incorporated herein by reference.

FIELD OF THE DISCLOSURE

The present disclosure is generally directed toward communications and more specifically toward web-based communications.

BACKGROUND

Web Real-Time Communications (WebRTC) is an Application Programming Interface (API) definition being drafted by the World Wide Web Consortium to enable browser-to-browser applications for voice calling, video chat, and Point-to-Point (P2P) file sharing without the need for browser plugins.

With the advent of WebRTC, there exists a need to support browser-to-phone communications as well as enhance certain aspects of browser-to-browser communications. In particular, the corporate Information Technology (IT) department will begin to feel the impacts of WebRTC. This may first take the form of needing to regulate the use of browser-based communications, much like the use of other non-secure consumer-centric communications services like Skype and FaceTime need to be regulated. It could later lead to integrating browsers with WebRTC with the Session Initiation Protocol (SIP)-based communications solutions deployed on premise, so that voice and video sessions can be established between the two. And eventually it could change the way communications software is deployed in the enterprise, with client-based soft phones and Unified Communications (UC) software being replaced by browser-based technologies.

Furthermore, while WebRTC facilitates browser-to-browser communications, it has been developed with the intention of facilitating browser-to-browser communications within a single web application (e.g., a single website). WebRTC does not, however, easily facilitate invocation of enterprise communication applications on such browser-to-browser communications. This is especially true if there are multiple web applications within a single enterprise that must be invoked. Meanwhile, application development in other protocols (e.g., SIP, H.323, etc.) is relatively mature. It would be desirable to enable the already-developed applications of SIP and H.323 to be used in WebRTC communications.

Some groups have begun developing WebRTC solutions that allow enterprise communication applications (e.g., Private Branch eXchanges (PBXs)) to be applied on WebRTC calls by embedding a SIP User Agent (UA) within the browser. This solution has a couple of shortcomings. First, if the browser is to be represented as a fully functional SIP endpoint having enterprise features, the embedded JavaScript SIP UA must be very rich and, therefore, complex. Second, these solutions don't allow for some communications to proceed as "pure" WebRTC communications and for others to proceed as SIP-based communications.

SUMMARY

It is with respect to the above issues and other problems that the embodiments presented herein were contemplated. In particular, embodiments of the present disclosure recognize that WebRTC is quite useful for browser-to-browser and browser-to-phone communications. One aspect of the present disclosure provides the ability to facilitate browser-to-phone communications and provide the browser with rich enterprise communication features. Currently-available WebRTC technologies make the browser operate in a simple mode and, therefore, the browser cannot access network resources (e.g., applications) that are usually available to the phone for traditional SIP and H.323 communications.

Embodiments of the present disclosure, therefore, provide the ability to receive a request from a web application to initiate a media session, examine the calling/called party preferences, and based on those preferences apply enterprise communication features to the call. In some embodiments, the above features are provided by a Collaboration Environment (CE) having exposure to browsers via Hypertext Transport Protocol (HTTP) Websockets or indirectly via Java Message Service (JMS). In some embodiments, the browsers are enabled to communicate with the CE via a purpose-built library, such as a JavaScript library. In such an implementation, the web application simply provides instructions to "make a call" and then the instructions enter the CE where additional call features are invoked as per a normal call directed to the phone instead of via a different dedicated websocket.

The present disclosure also provides an enhanced Application Media Server (AMS) that converts the WebRTC Real-Time Protocol (RTP) stream into SIP/H.323 friendly RTP. The AMS may also provide the media services to the CE services.

It is another aspect of the present disclosure to facilitate browser-to-browser communications when the communications traverse a network boundary where one or more communication regulations/restrictions may need to be enforced (e.g., at a firewall). Specifically, when browser-to-browser communications traverse such a network boundary, the need exists to leverage the enterprise communications system that already has knowledge of the regulations/restrictions and can, therefore, enforce the regulations/restrictions for the WebRTC session.

In some embodiments, the interface between the browser and the enterprise communication system can be achieved by utilizing a SIP Endpoint Adapter (SEA), which is described in U.S. patent application Ser. No. 13/846,710 filed on Sep. 26, 2012, the entire contents of which are hereby incorporated herein by reference. The SEA enables the browser or multiple browsers to be presented to the enterprise network infrastructure as a single device.

In some embodiments, the Collaboration Environment (CE) presents a websocket or some other HTTP-based protocol to browsers and such browsers are enabled to communicate with the SEA via a CE JavaScript library made available to the browser. The process begins with a user and/or client device registering with a CE of an enterprise network. Once registered, the CE can recognize and properly process calls placed by the user and/or the user's client device as well as recognize and properly process calls directed toward the user and/or the user's client device. Thus, when a WebRTC communication session is established one of the browsers operated by the registered user and/or the user's client device utilizes the CE JavaScript library to interface the browser with the CE of an enterprise communication network. The CE interfaces the browser with the enterprise applications (e.g., call logging, personal call handling applications, call recording, etc.) and points those applications to the communication session. The CE makes the applications available and enforces any policies against the communication session on behalf of those applications. Further still, the CE enables rich Unified Communications (UC) operations to be invoked for the communication session involving the browser. Examples of rich UC operations made available for the WebRTC call include, without limitation, call transfer, call forward, conference, join call, record call, and block call operations.

In some embodiments, the CE is configured to support communications in a number of different ways. First, the CE is configured to adapt the WebRTC browser/session to look like a SIP/H.323 endpoint. This would generally be done by using a SEA, and essentially enables legacy communication applications to be invoked for a WebRTC session. Second, the CE is configured to directly invoke the protocol agnostic API to facilitate communications in a native mode of operation.

It is another aspect of the present disclosure to provide a CE with a WebRTC Protocol Adapter having a JMS/websocket and a native mode-enabling component. In some embodiments, the Protocol Adapter communicates with a protocol agnostic feature invoker. The protocol agnostic communication feature invoker and API serve as a point in the CE where the communication applications can be invoked regardless of the type of communication session (e.g. WebRTC or SIP).

In some embodiments, the CE may support a "native" mode of operation and a traditional "SIP" mode of operation. When executing on a SIP call, the CE will use a SEA to access the applications in the enterprise network through the SIP interface. These applications may include applications deployed on the CE. However, when executing in a WebRTC call, the CE will invoke only the applications deployed on the CE. The CE-deployed applications are able to handle both types of calls equally well due to the protocol agnostic API.

In the native mode of operation, the applications accessed by the CE are natively operating in the CE. In the SIP or H.323 mode, however, the applications may be operating in the CE or may be operating in a broader enterprise communications network. Regardless of the location of the applications, the applications respond to the SEA as they would normally respond to any other SIP or H.323 entity. Accordingly, because of the protocol agnostic communication API, the WebRTC session can utilize applications that were developed for other protocols, such as SIP and H.323, as an example.

In summary, it is one aspect of the present disclosure to provide a system and method to enable a user's enterprise calling features (e.g., features or applications invoked based on SIP calling preferences of the user) to be leveraged in a WebRTC session.

It is another aspect of the present disclosure to provide a system and method to achieve a browser-to-browser communication session enhanced with rich enterprise communication features, whereby the enterprise communication features may be applied locally (e.g., within the enterprise communication network) without necessarily involving the entire enterprise communication architecture.

It is another aspect of the present disclosure to provide a protocol agnostic communication API that makes SIP and/or H.323 applications available for use in a WebRTC communication session.

In some embodiments, a method is provided that generally comprises:

receiving a request to bind a browser to an enterprise communication network, wherein the request is received via a web-based protocol; and in response to receiving the request to bind, creating an association between the browser and the enterprise communication network such that the browser is enabled access to one or more applications within the enterprise communication network, wherein the enterprise communication network facilitates communications with a protocol other than the web-based protocol.

In some embodiments, the communication session is a browser-to-browser communication session. In some embodiments, the communication session is a browser-to-phone communication session.

In another embodiment, a method is provided that generally comprises:

providing a protocol agnostic Application Programming Interface (API) between communication applications and an application platform that enables call and media control on communication sessions;

receiving a request to initiate a communication session;

invoking at least one of the communication applications such that a protocol used to initiate the communication session is hidden from the invoked at least one of the communication applications thereby enabling the invoked at least one of the communication applications to apply its features to the communication session without knowledge of the protocol; and enabling a web browser to access the features applied by the invoked at least one of the communication applications as if the web browser were using some protocol other than a web-based protocol.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "address of record" or "address or record URI" ("AoR") refers to a URI that corresponds to a user. Unlike a contact URI (or device URI), a request sent to an AoR requires database lookups and service and feature operations and can result the request being sent to one or more end (communication) devices. An AoR is usually used in TO and FROM header fields. This is a common way to reach a person and is suitable for storing in address books and in returning missed calls.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "contact URI" refers to a device Universal Resource Indicator ("URI"). A device URI is typically in a CONTACT header field and is associated with a particular user for a period of time. An address of record URI can be related or bound to a contact URI.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The term "uniform resource identifier" (URI) is a string of characters used to identify a name or a resource.

The term "uniform resource locator" or "universal resource locator" (URL) is a specific character string that constitutes a reference to an Internet resource.

A "user agent" refers to a Session Initiation Protocol ("SIP")-enabled endpoint device. The user agent takes direction and/or input from a user and acts as an agent on behalf of the user to set up and tear down media sessions.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
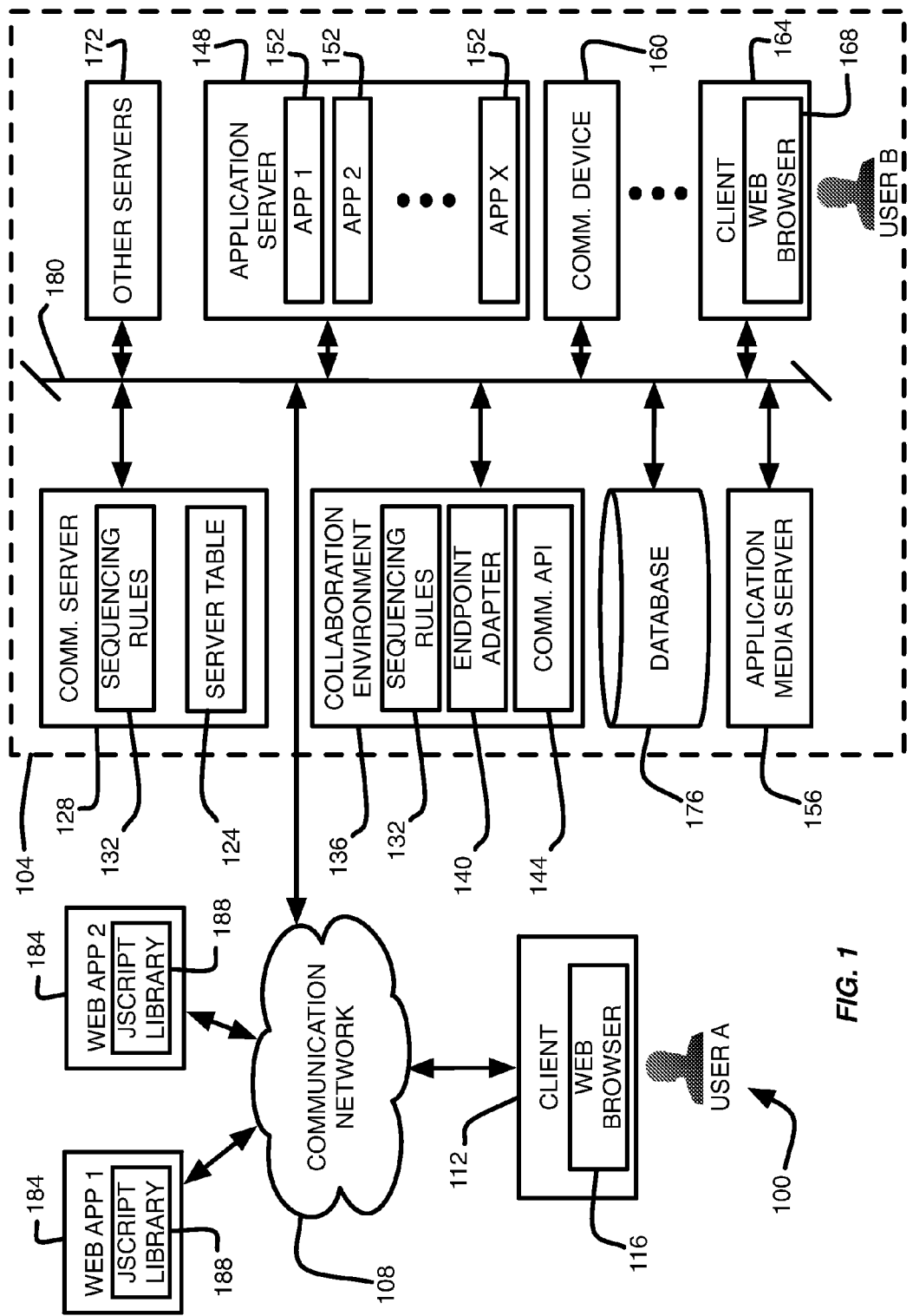
FIG. 1 is a block diagram of a communication system in accordance with embodiments of the present disclosure.

FIG. 1 depicts a communication system 100 according to an embodiment of the present disclosure. The communication system 100 may include an enterprise network 104 that is in communication, via a (typically untrusted or unsecure or public) communication network 108, with one or more external communication devices, which may be in the form of a client device 112 with a web browser 116. It should also be appreciated that other types of external communication devices may be provided in addition to or in lieu of the client device 112 with a browser 116.

The communication network 108 may be packet-switched and/or circuit-switched. An illustrative communication network 108 includes, without limitation, a Wide Area Network (WAN), such as the Internet, a Public Switched Telephone Network (PSTN), a Plain Old Telephone Service (POTS) network, a cellular communications network, a Voice over IP (VoIP) network, an IMS network, or combinations thereof. In one configuration, the communication network 108 is a public network supporting the TCP/IP suite of protocols.

The external client 112 is generally referred to as "external" because it is either not under the direct control of the enterprise administering the enterprise network 104 or has a decreased level of trust with the enterprise network 104 as compared with communication devices 136 and/or client devices 164 that are within the enterprise network 104. Illustrative types of client devices 112 include, without limitation, smartphones, laptops, Personal Computers (PCs), tablets, and the like. The web browser 116 executed by the client 112 may be stored as an application on the client 112 or it may correspond to a cloud-based application that is made available to the client 112 via cloud-based computing techniques. Non-limiting examples of web browsers 116 that may be utilized on the client 112 include, without limitation, Chrome®, Internet Explorer®, Safari®, Firefox®, or any other type of application that enables the client 112 to interface and communicate with one or more web applications 184 (e.g., websites or webservers) via web-based communication protocols (e.g., HyperText Transport Protocol (HTTP), Secure HTTP (SHTTP), mobile web protocols, lightweights web protocols, etc.). FIG. 1 also shows that each of the web applications 184 may include a JavaScript library 188 that interfaces to the web browser 116 and endpoint adapter 140 to initiate calls via WebRTC. Although not depicted, it should also be appreciated that one or more web applications 184 may be contained within the enterprise network 104 without departing from the scope of the present disclosure.

The enterprise network 104 may include a boundary device 120 including a server table 124, one or multiple communications servers 128 including sequencing rules 132, a Collaboration Environment (CE) 136 having an endpoint adapter 140 and one or more communication APIs (144), one or more internal communication devices 160, one or more internal client devices 164 with a web browser 168, one or more application servers 148 which may be capable of providing one or multiple applications 152, one or more application media servers 156, a number of other servers 172, and an enterprise database 176, all of which are interconnected by a (trusted or secure or private) Wide Area Network (WAN), Local Area Network (LAN), or combination thereof 180. Some or all of the functions depicted in FIG. 1 may be co-hosted and/or co-resident on a single server. Alternatively or additionally, some or all of the components of the enterprise network 104 may be made available via cloud computing technologies. For instance, some or all functions of the servers may be made available from a cluster of servers that may or may not necessarily be co-located with the communication devices 160 and/or 164. In other words, the enterprise network 104 may be partially cloud-based and access to the resources of the cloud-based network may be obtained through the communication network 108. The depiction of components in FIG. 1 is generally intended to be a logical depiction of the components of the system 100.

It should be further appreciated that the components of the enterprise network 104 may facilitate traditional SIP-based communications and/or H.323-based communications between two or more communication endpoints (e.g., client 112, communication device 160, and/or client 164). The SIP and/or H.323-based communications are provided in any normal fashion. As will be discussed in further detail herein, however, one or more components of the enterprise network 104 may also facilitate web-based communication sessions (e.g., WebRTC communications), where one or more web browsers 116 and/or 168 are involved in the communication session.

In the depicted embodiment, the communication network 108 is shown as being connected to the WAN 180. It should be appreciated that one or more network border elements such as a firewall, Session Border Controller (SBC), or the like may reside between the two networks. However, for ease of illustration and description, the system 100 is shown without such a network border element.

The communications server 128 is shown to include a server table 124, which may enable the communications server 128 to route communication requests to appropriate other communications servers 128 that are authoritative for users within the enterprise network 104. While the communications server 128 may be configured to register users within the enterprise network 104, the CE 136 may be configured to register a web browser 116 to a user identity within the enterprise network 104, thereby exposing the capabilities of the CE 136 (e.g., rich call features) to the web browser 116 for both incoming and outgoing calls.

More specifically, the server table 124 may be utilized for initially routing communications within the enterprise network 104 to the communications server 128 responsible for servicing a particular user (e.g., User A and/or User B) involved in the communication session. For example, if an enterprise user (e.g., User B) is being called by an external client device 112, then the communications server 128 may initially receive the inbound call, determine that the call is directed toward User B, reference the server table 124 to identify the authoritative communications server 128 for User B, and route the inbound call to the authoritative communications server 128.

Likewise, communications between internal enterprise users (e.g., between communication device 160 and client 164 or between two internal client devices 164) may first be serviced by the originating user's authoritative communications server 128 during the origination phase of communications set-up. After the origination phase is complete, the authoritative communications server 128 of the terminating (or called) user may be invoked to complete the termination phase of communications set-up. In some embodiments, the communications server 128 for the originating and terminating user may be the same, but this is not necessarily required. In situations where more than two enterprise users are involved in a communication session, authoritative communications servers 128 for each of the involved users may be employed without departing from the scope of the present invention. Additionally, the authoritative communications servers 128 for each user may be in the same enterprise network 104 or in different enterprise networks 104, which are owned by a common enterprise but are separated by the communication network 108.

In accordance with at least some embodiments of the present invention, the mapping of user identities within a communication request does not necessarily have to occur at the communications server 128. For instance, the mapping between an authoritative server and a user may occur at a network boundary device or within the enterprise network 104 at some other component (e.g., at CE 136)

The communications server 128 can include a Private Branch eXchange (PBX), an enterprise switch, an enterprise server, combinations thereof, or other type of telecommunications system switch or server. The communications server 128 is preferably configured to execute telecommunication functions such as the suite of or Avaya Aura™ applications of Avaya, Inc., including Communication Manager™, Avaya Aura Communication Manager™, Avaya IP Office™, Communication Manager Branch™, Session Manager™, System Manager™, MultiVantage Express™, and combinations thereof.

Although only a single communications server 128 is depicted in FIG. 1, two or more communications servers 128 may be provided in a single enterprise network 104 or across multiple separate LANs 180 owned and operated by a single enterprise, but separated by a communication network 108. In configurations where an enterprise or an enterprise network 104 includes two or more communications servers 128, each server 128 may comprise similar functionality, but may be provisioned for providing its features to only a subset of all enterprise users. In particular, a first communications server 128 may be authoritative for and service a first subset of enterprise users whereas a second communications server 128 may be authoritative for and service a second subset of enterprise users, where the first and second subsets of users generally do not share a common user. This is one reason why the communications server 128 may be provided with a server table 124.

Additionally, multiple communications servers 128 can support a common user community. For example, in geo-redundant and other applications where users aren't necessarily bound to a single application server, there may be a cluster of equivalent servers where a user can be serviced by any server in the cluster.

In some embodiments, the sequencing rules 132 provided on the communications server 128 may correspond to or describe communication feature preferences for each user for which it is authoritative. The sequencing rules 132 for a particular user are referenced by the authoritative communications server 128 for the user to determine which, if any, features should be incorporated into a communication session for the user (e.g., via an application 152) and an order in which such features should be incorporated into the communication session. The communications server 152 can actually provide communication features directly into the communication session or determine an application sequence, which will be invoked during set-up and used during the communication session.

It should be appreciated that the sequencing rules 132 may be a list of preferences, may be a table containing communication preferences, or can be in any other suitable format. Furthermore, the sequencing rules 132 can be provisioned by users and/or by administrative personnel. As shown in FIG. 1, the sequencing rules 132 may alternatively or additionally be provided in the CE 136, thereby enabling the CE 136 to sequence applications in a native mode of operations as will be described in further detail herein.

It is also to be understood that any data structure can be used to render the various preference tables, including, without limitation, primitive, composite, or abstract data types, linear data structures, tree data structures, hashes, graphs, and the like.

The CE 136 may correspond to another server, whose purpose is to facilitate WebRTC communications to leverage applications 152 and other call features of the enterprise network 104. Another aspect of the CE 136 includes the ability the ability to provide a platform for applications that can be invoked for WebRTC and other types of communication sessions.

With respect to the leveraging of applications 152, if a communication session includes WebRTC (e.g., at least one browser 116 is being employed), then the CE 136 may be invoked to provide the browser 116 and/or 168 with access to features of the enterprise network 104 that would not be available if the simple WebRTC protocols were followed. In some embodiments, the CE 136 utilizes an endpoint adapter 140 that makes itself available to web browsers 116 external to the enterprise network 104. Additional behaviors of the endpoint adapter 140 are described in U.S. patent application Ser. No. 13/846,710 filed on Sep. 26, 2012, the entire contents of which are hereby incorporated herein by reference. In some embodiments, the endpoint adapter is configured to represent the browser as a fully feature-enabled endpoint using another protocol, thereby enabling it to leverage all of the features of an existing enterprise communications network 104.

The CE 136 may further include a protocol agnostic communications API 144 that enables the endpoint adapter 140 to access the various components of the enterprise network 104 (e.g., applications 152, communication server 128, database 176, application media server 156, other servers 172, etc.). In some embodiments, the endpoint adapter 140 is configured to abstract session and/or media control signaling received from the browser 116 (e.g., session and/or media controls transmitted in accordance with WebRTC definitions) such that they can be understood by the components of the enterprise network 104 that do not natively support WebRTC. The protocol agnostic communications API 144, on the other hand, is configured to enable applications operating within the CE 136 to provide their features to a communication session regardless of what protocol the underlying endpoints are utilizing. As an example, the protocol agnostic communications API 144 may be configured to abstract session and/or media control signals from the specific protocol being used such that they can be understood or translated into a different protocol (e.g., WebRTC to SIP, WebRTC to H.323, SIP to WebRTC, H.323 to WebRTC, etc.).

The WAN 180 can be secured from intrusion by untrusted parties by a gateway and/or firewall located between the WAN 180 and communication network 108. In some embodiments the boundary device 120 may include the functionality of the gateway and/or firewall. In some embodiments, a separate gateway or firewall may be provided between the communication network 108 and WAN 180. More specific examples of devices that may be provided between the communication network 108 and WAN 180 include a reverse-proxy and a STUN/TURN server.

The other servers 172 may comprise email servers, voicemail servers, calendaring servers, conferencing servers, and other types of servers known to provide particular services to client devices. In some embodiments, the other servers 172 may also be considered application servers 148, which provide one or more applications 152 for use in a communication session.

The internal communication devices 136 may be provisioned, and often owned, by the enterprise. Exemplary types of communication devices 160 include, without limitation, any capable phone, hardphone, softphone, SIP-capable phone, H.323-capable phone, smartphone, cellular phone, PC, laptop, tablet, and/or digital telephone. Examples of suitable telephones include the 1600™, 2400™, 4600™, 5400™, 5600™, 9600™, 9620™, 9630™, 9640™, 9640G™, 9650™, and Quick Edition™ telephones, IP wireless telephones (such as Avaya Inc.'s IP DECT™ phones), video phones (such as Avaya Inc.'s Videophone™), and softphones of Avaya, Inc.

The enterprise database 176 includes enterprise subscriber information, such as name, job title, electronic address information (e.g., telephone number, email address, instant messaging handle, direct dial extension, and the like), subscriber contact lists (e.g., contact name and electronic address information), other employee records, and the like. Additionally or alternatively, the enterprise database 176 may contain presence information for a user, communication capabilities for a user, and any other dynamic variable that is retrievable by the communication server 128 and/or CE 136. In some embodiments, the database 176 may comprise data in a certain structural format (e.g., hierarchical database, SQL database, etc.) or an unstructured format (e.g., No-SQL database, etc.). The database 176 may include persistent storage (disk) or may be only an in-memory database.

In accordance with at least some embodiments, the communications server 128 determines an application sequence and causes one or more applications 144 to be sequenced into a communication session in accordance with the sequencing rules 132. In particular, the communications server 128 is configured to analyze a particular user's sequencing rules 132 and invoke the necessary applications 152 and routing to fulfill such preferences. When operating in concert with the CE 136, the communication server 128 may determine and invoke enterprise applications 152 for traditional phone-to-phone communication sessions, browser-to-phone communication sessions, and/or browser-to-browser communication sessions. Thus, although the communication server 128 is depicted as being separate from the CE 136, it should be appreciated that the communication server 128 and CE 136 may be executed on a single server and, in some embodiments, the functionality of one component may be incorporated into the other component (e.g., CE 136 functionality may be incorporated into the communication server 128 or the communication server 128 functionality may be incorporated into the CE 136).

Once an application sequence is determined by the communications server 128, the communications server 128 passes the communication-establishing message to a first application 152 in the application sequence, thus allowing the first application to determine the parameters of the communication session, insert itself into the control and/or media stream of the communication session, and thereby bind itself to the communication session. Once the first application has inserted itself into the communication session, the first application either passes the communication-establishing message back to the communications server 128 to identify the next application in the application sequence (e.g., based on the sequencing rules 132) or passes the communication-establishing message directly to a second application 152 in the application sequence. Alternatively, or in addition, the message may be redirected, rejected, or the like. Moreover, parties and/or media servers may be added to the call by an application 152.

Examples of the types of applications 152 that may be provided by the application server 148 include, without limitation, call recording applications, communication log services, conferencing applications, security applications, encryption applications, collaboration applications, whiteboard applications, mobility applications, presence applications, media applications, messaging applications, bridging applications, and any other type of application that can supplement or enhance communications. As with the communications server and CE 136, the application server 148 or applications 152 may be co-located with the CE 136 and/or communication server 128, or vice versa, without departing from the scope of the present disclosure.

Figure 2:
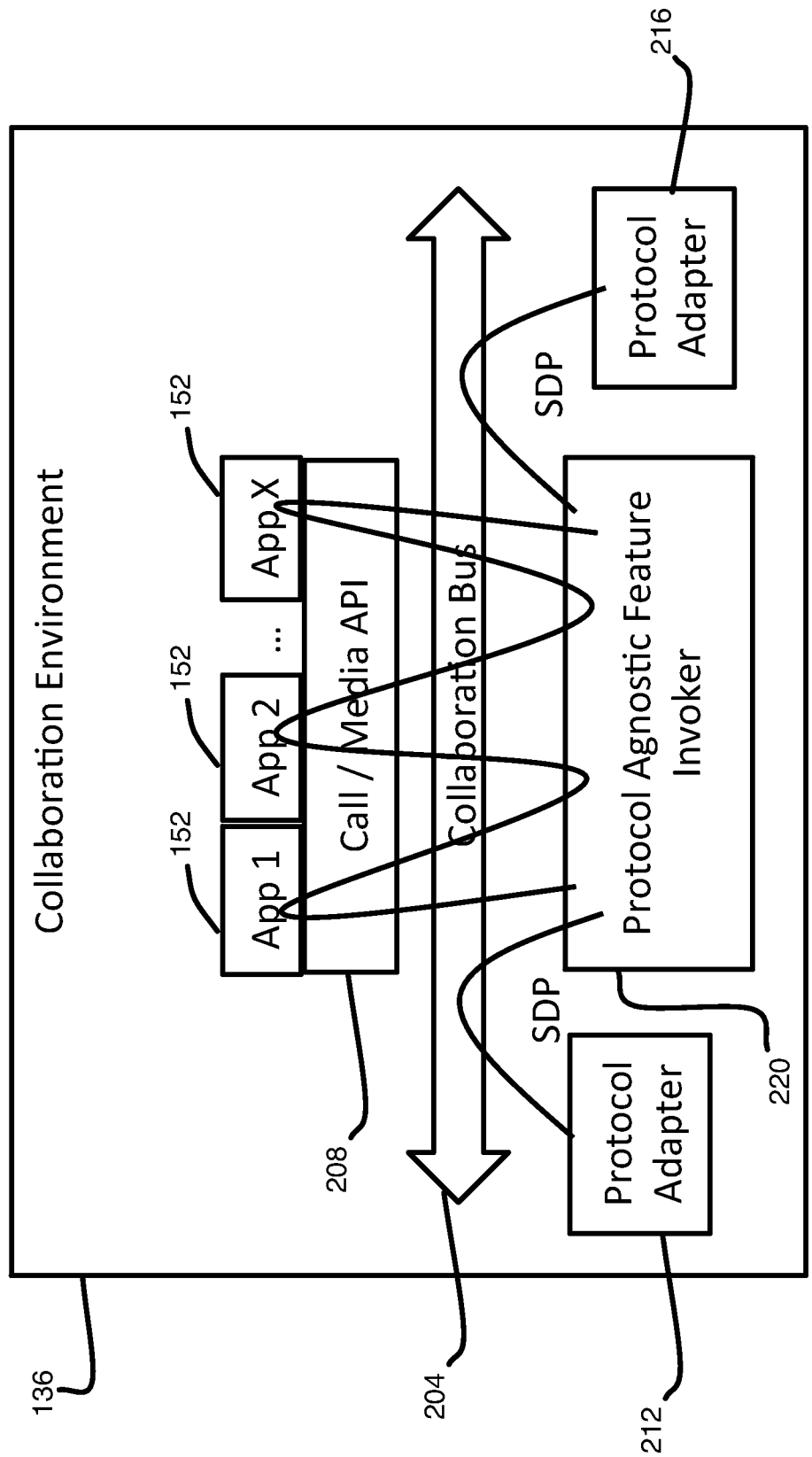
FIG. 2 is a block diagram depicting additional details of a collaboration environment in accordance with embodiments of the present disclosure.

With reference now to FIG. 2, additional details of the CE 136 will be described in accordance with at least some embodiments of the present disclosure. Specifically, the CE 136 is shown to include a collaboration bus 204, a call/media API 208, a first protocol adapter 212, a second protocol adapter 216, and a protocol agnostic feature invoker 220. FIG. 2 also shows that the CE 136 may comprise one or more native applications 152, which may be the same or similar to the other applications 152 described herein.

The first and second protocol adapters 212, 216 may be configured to perform protocol normalization such that everything else inside the CE 136 is protocol agnostic. More specifically, the protocol adapters 212, 216 enable the collaboration bus 204, call/media API 208, and feature invoker 220 to all operate in a protocol agnostic manner. Non-limiting examples of suitable protocol adapters 212, 216 include an IMS Service Control (ISC) interface, a plain SIP UA, an Advanced SIP Telephony (AST) interface, and a WebRTC gateway. The protocol adapters 212, 216 may also be configured to present a control and/or signaling interface to the web applications 184 and/or browsers 116, 168. In some embodiments, the web applications 184 may be configured to provide simple commands to a protocol adapter 212 and/or 216 such as "make call" commands. The browsers 116, 168, on the other hand, may utilize the JavaScript library 188 provided by the web applications 184 to exchange control and/or status signals with the CE 136. Specifically, the JavaScript library 188 may provide the browsers 116, 168 with instructions for communicating with the protocol adapters 212, 216. Moreover, the exchanges between the browsers 116, 168 and CE 136 may be performed in accordance with WebRTC protocols.

As can be appreciated, the protocol adapters 212, 216 may enable the CE 136 and its components to exchange communications within the enterprise network 104 and outside the enterprise network (e.g., with the communication network 108). Inside the CE 136, however, the communications may be protocol agnostic. The CE 136 may, therefore, be configured to translate communications between WebRTC, SIP, H.323, and any other non-web-based protocol. As will be discussed herein, the protocol adapters 212 may enable the CE 136 to exchange communications with the application media server 156, thereby enabling the CE 136 to invoke the application media server 156 for a browser-to-phone or browser-to-browser communication session. It should be noted that the application media server 156 may not be needed for browser-to-browser communication sessions since point-to-point RTP is supported in WebRTC; however, it may be desirable to include one or more application media servers 156 to play announcements, provide recording capabilities, etc., for a WebRTC call.

In some embodiments, the call/media API 208 enables the protocol agnostic feature invoker 220 to invoke one or more applications 152 contained within the CE 136. Advantageously, the applications 152 can be function without concern for the underlying protocol used between endpoints during a communication session.

As shown in FIG. 2, the call/media API interfaces with the protocol agnostic feature invoker 220 via the collaboration bus 204. The collaboration bus 204 may be similar in nature to an Enterprise Service Bus or JMS bus. Communications between the protocol agnostic feature invoker 220 and call/media API 208 all pass through the collaboration bus 204.

The protocol agnostic feature invoker 220, in some embodiments, may utilize or have access to the sequencing rules 132 to help determine which applications 152 should be invoked for a particular communication session. The call/media API 208 may provide the interface between the protocol agnostic feature invoker 220 and the applications 152. In some embodiments, the collaboration bus 204, call/media API 208, and protocol agnostic feature invoker 220 may be collectively referred to as the protocol agnostic communications API 144.

In some embodiments, the protocol adapters 212, 216 may communicate with the protocol agnostic feature invoker 220 via the collaboration bus 204. More specifically, the protocol adapters 212, 216 may exchange information with the protocol agnostic feature invoker 220 via Session Description Protocol (SDP) messages.

Figure 3:
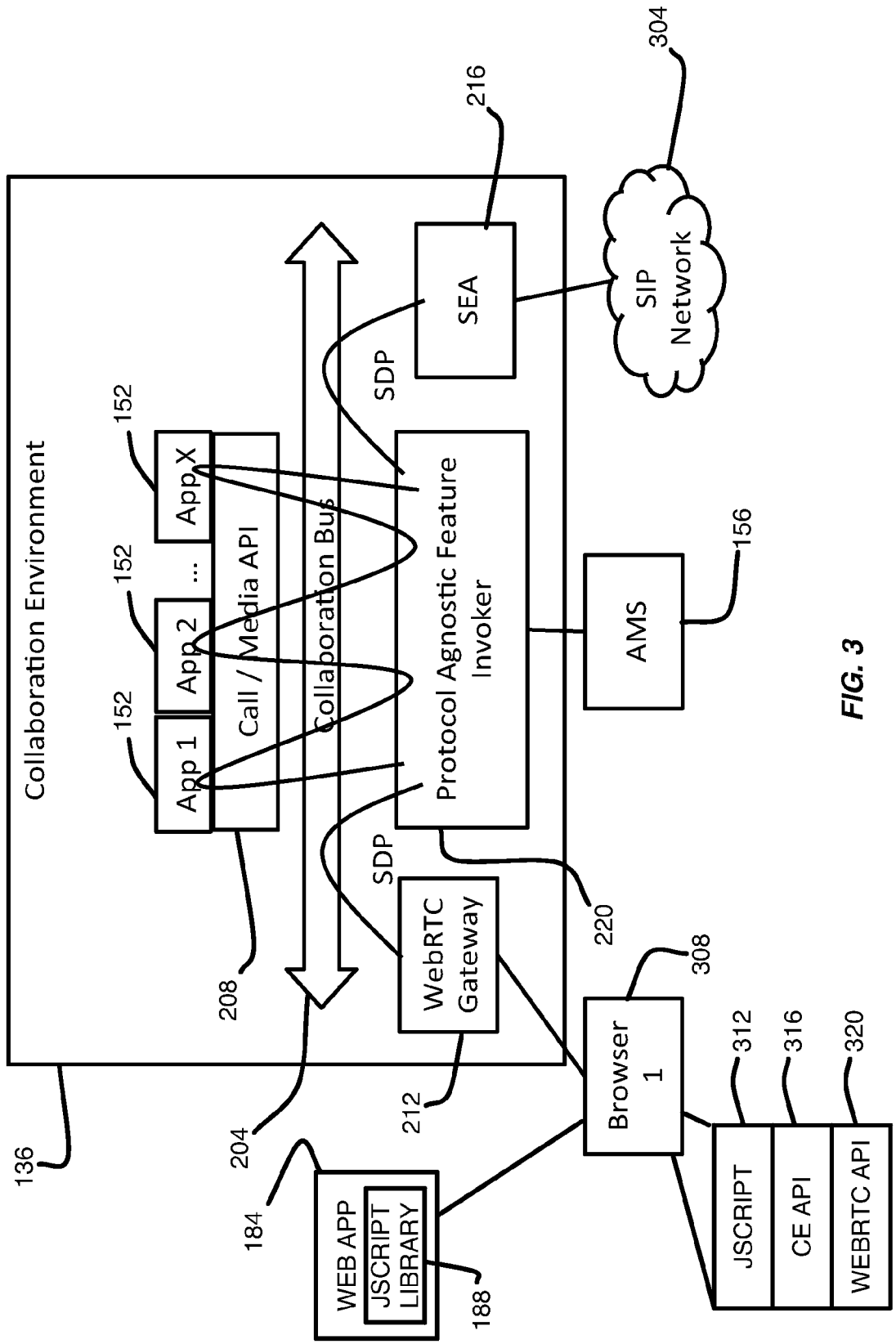
FIG. 3 is a block diagram depicting a first communication system configuration in accordance with embodiments of the present disclosure.

With reference now to FIG. 3, additional details of the CE 136 and its interaction with a browser 308 will be described in accordance with embodiments of the present disclosure. As shown in FIG. 3, the first protocol adapter 212 may correspond to a WebRTC gateway and the second protocol adapter 216 may correspond to an endpoint adapter 140. The endpoint adapter 216 interfaces the CE 136 to an enterprise network 304, such as a SIP network. It should be appreciated that the enterprise network 304 may be a H.323 network or any other network using any type of communication protocol known in the art.

FIG. 3 also shows how the web browser 308 interfaces with the CE 136 via the WebRTC gateway 212. In particular, the web browser 308 may receive information for interfacing with the WebRTC gateway 212 from the JavaScript library 188 on the web application or web server 184. Using the functionality of the JavaScript library 188, the web browser 308 can initiate and achieve WebRTC sessions that incorporate applications 152 from the enterprise communication network 104. It should also be noted that the signaling between the web browser 308 and CE 136 might actually be relayed by the web server 184 to the CE 136 in cases where Cross-Origin Resource Sharing (CORS) is not supported. In other words, embodiments of the present disclosure enables a browser 308 to interface directly to another server than that from which it got the HTML/JavaScript.

In some embodiments, the web browser 308 may correspond to a browser operating on an internal client 164 or external client 116.

FIG. 3 also depicts how the protocol agnostic feature invoker 220 is provided with the ability to invoke an application media server 156 for a communication session involving a web browser 308. More particularly, protocol agnostic feature invoker 220 may invoke the application media server 156 to convert WebRTC RTP streams (e.g., RTP streams transmitted and understood by the web browser 308) to SIP/H.323 RTP streams (e.g., RTP streams transmitted and understood by the communication device 312). The application media server 156 may also be configured to provide media services to the CE 136 (e.g., to support media-specific applications 152 operating in the CE 136).

In accordance with at least some embodiments, the browser 308 may comprise JavaScript 312 from the web application, a CE JavaScript library exposing a CE API 316, and a WebRTC API 320. As will be discussed in further detail herein, the JavaScript 312, CE API 316, and WebRTC API 320 may cooperate to enable the browser 308 to exchange communications with the CE 136 via the WebRTC gateway 212. In operation, when the user requests a registration by clicking a URL or icon displayed in the browser 308, the web application 184 may receive a call or invocation command from the browser 308. Upon invocation, the web application JavaScript 312 may invoke a register( ) operation on the CE API (316). This causes the CE API 316 to send a register message to the WebRTC Gateway 212 with the user's credentials. The WebRTC Gateway 212 validates the user's credentials, then invokes the SEA 216 to register a virtual SIP endpoint with the SIP network 304. A binding now exists between the browser 308 and the SIP network 304 such that the browser appears to the SIP network as a fully functional SIP endpoint capable for making calls, receiving calls and performing advanced call control operations.

Once the registration is complete, the Web Application 184 may continue interacting with the CE API 316 in order to initiate or otherwise control calls. For instance, the Web Application JavaScript 312 may invoke a makeCall( ) operation on the CE API (316) to initiate a call to a particular phone number or Address of Record. This causes the CE API 316 on the web browser 308 to invoke a getMediaOffer( ) to the WebRTC API 320 on the browser 308. A makeCall message is then sent from the CE API 316 to the WebRTC gateway 212 with the media offer and the destination address.

After the registration step, the CE 136 is able to represent the browser 308 to the enterprise communication network 304 via the SEA 216. Furthermore, the CE 136 may enable the establishment of a communication session for the browser 308 that incorporates one or more enterprise applications from the enterprise network 304 and/or one or more applications 152 within the CE 136 into the communication session. For applications 152 outside the CE 136, this may be done by the CE 136 transmitting an INVITE message to the device addressed in the makeCall( ) operation originally transmitted by the web browser 308. For applications 152 within the CE 136, the protocol agnostic feature invoker 220 may invoke one or more applications 152 via the call/media API 208. Of course, the INVITE message may traverse several servers on its way to the destination address so that one or more applications can be sequenced into the communication session. In some embodiments, the CE 136 represents the browser 308 to all servers and communications endpoints of the enterprise network 304 and such representations are made via SIP and/or H.323 (e.g., a protocol employed by the enterprise network 304).

Figure 4:
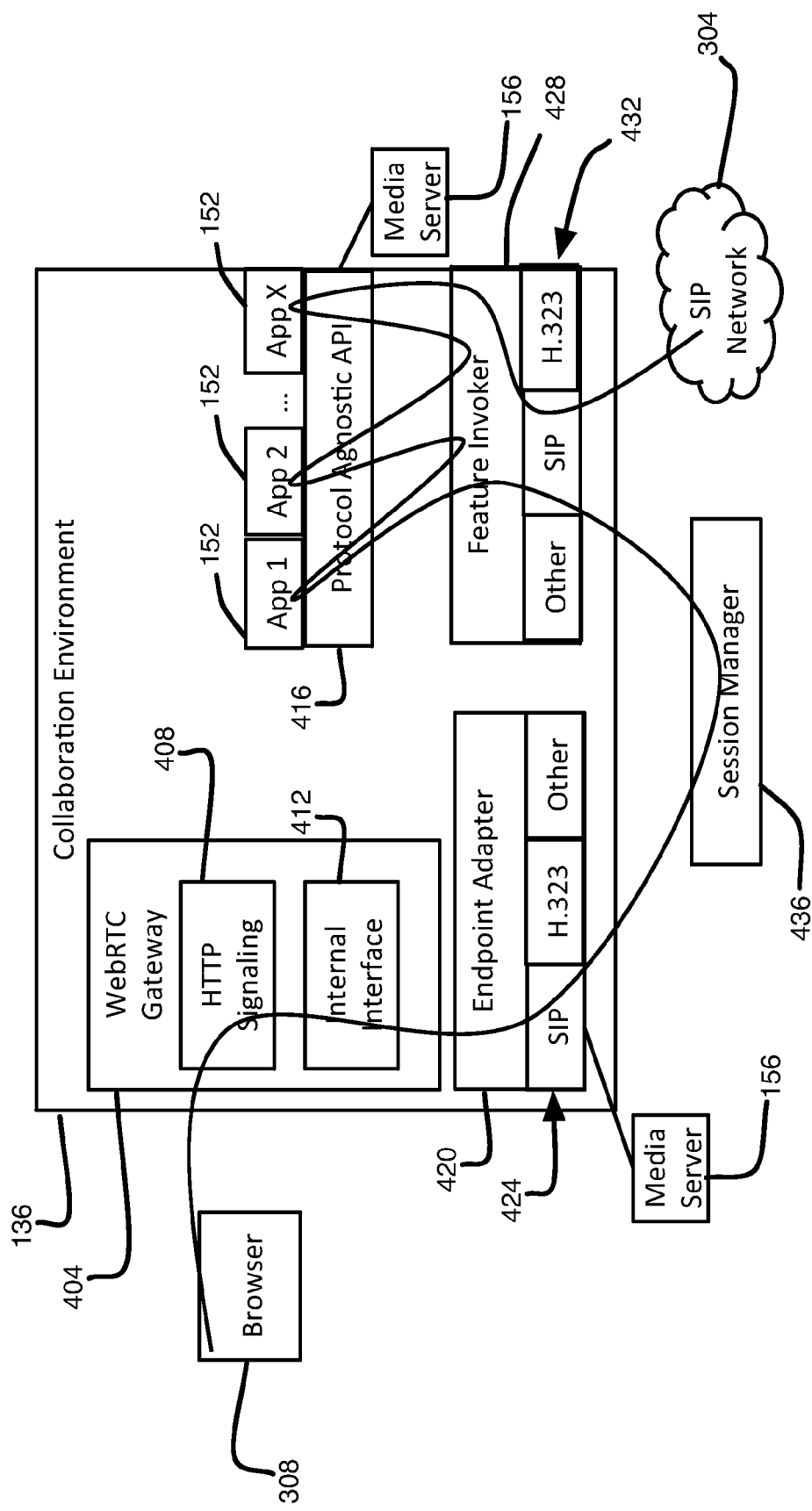
FIG. 4 is a block diagram depicting a second communication system configuration in accordance with embodiments of the present disclosure.

FIG. 4 shows an alternative architecture that may be employed by the CE 136 to accomplish similar or identical functions of the architecture depicted in FIGS. 1-3. Specifically, the CE 136 is shown to include a WebRTC gateway 404, which may be similar or identical to the WebRTC gateway 212 of FIG. 3. The WebRTC gateway 404 comprises an HTTP signaling component 408 that faces toward the browser 308 and an internal interface 412 that faces toward other components of the CE 136. The HTTP signaling 408 may exchange communications with the browser 308 via web-centric WebRTC protocols and the internal interface 412 may exchange communications within the CE 136 in a protocol agnostic fashion.

The CE 136 further comprises an endpoint adapter 420, which may be similar or identical to the endpoint adapter 140 depicted in FIG. 1. The endpoint adapter 420 may comprise a plurality of protocol components 424 that enable the endpoint adapter 420 to communicate with an external session manager 436 in any protocol understood by the session manager 436. In some embodiments, the endpoint adapter 420 may further be configured to invoke an external media server 156, much like the protocol agnostic feature invoker 220 of FIG. 3.

The session manager 436 may be similar or identical to the communications server 128 of FIG. 1 in that the session manager 436 may be responsible for determining an application sequence for a communication session. Alternatively or additionally, feature invocation may be performed at a feature invoker 428 internal to the CE 136. The internal feature invoker 438 may be similar or identical to the protocol agnostic feature invoker 220 and may facilitate a native mode of operation for the CE 136 as will be discussed in further detail below. Like the endpoint adapter 420, the feature invoker 428 may comprise a plurality of protocol components 432 that enable the feature invoker 428 to exchange communications via any protocol supported by the enterprise network 304 (e.g., SIP, H.323, etc.).

The CE 136 of FIG. 4 is also depicted as including a protocol agnostic API 416. This protocol agnostic API 416 may be similar or identical to the communications API 144 and/or call/media API 208. The protocol agnostic API 416 may provide a conduit between the feature invoker 428 and native applications 152 contained within the CE 136. Additionally or alternatively, the protocol agnostic AIP 416 may also provide an interface between the CE 136 and an external media server 156, which may be part of the enterprise network 304 or external to the enterprise network 304.

Figure 5:
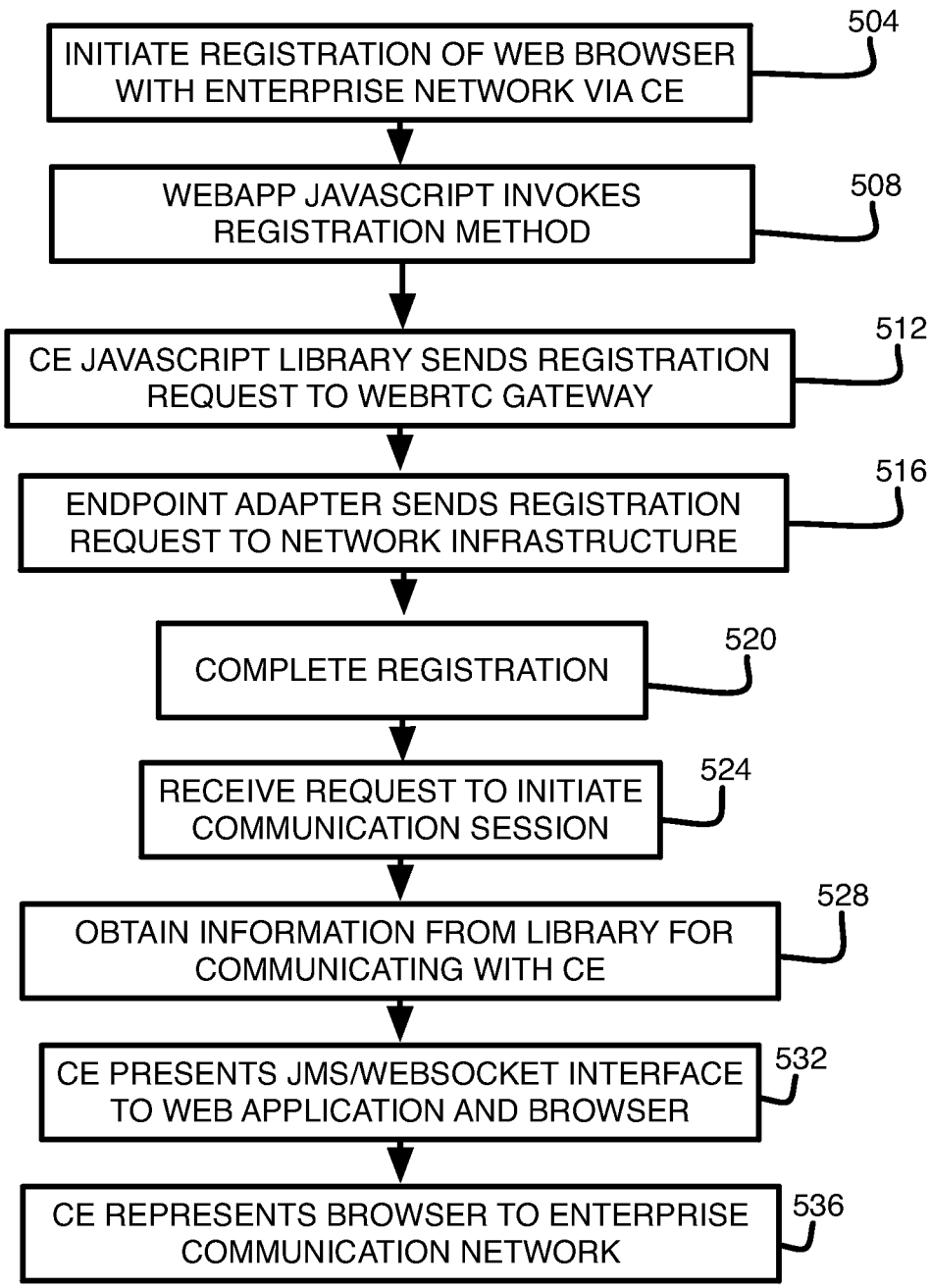
FIG. 5 is a flow diagram depicting a first communication method in accordance with embodiments of the present disclosure.

With reference now to FIG. 5, methods of invoking browser-to-browser and/or browser-to-phone communication sessions with the assistance of the CE 136 will be described in accordance with embodiments of the present disclosure. It should be appreciated that the method of FIG. 5 may be performed by any type of system architecture depicted and described herein. Specifically, the architecture of FIG. 1, FIG. 2, FIG. 3, and/or FIG. 4 may be employed to execute some or all of the method steps described in connection with FIG. 5.

The method begins when a user initiates registration of their web browser 308 with an enterprise network 304 via the CE 136 (step 504). In some embodiments, registration of the web browser 308 may include having a user provide a user name, password, and/or other authentication information to the CE 136 via an open web browser 308. It should also be noted that the CE JavaScript Library 188 and the CE API 316 exposed by that JavaScript library may be used for the registration step as well.

Once the registration has been initiated, the method continues with the WebApp JavaScript invoking a registration method on the CE JavaScript library 312 (step 508). In response to the registration method being invoked, the CE JavaScript library 312 sends a registration request to the WebRTC gateway 212 (step 512). At this point, the CE 136 can control the registration of the browser 308 and its user with the other network infrastructure. Accordingly, the CE 136 may continue the registration method by having the SEA 216 send the registration request to the SIP network 304, thereby registering the user with the enterprise network 304 (e.g., via a communications server 128) (steps 516 and 520).

In some embodiments, the information provided from the web browser 308 to the CE 136 during registration may include a user name and password. The CE 136 may verify the authenticity of the user name and password combination or provide the information to an authentication server contained in the enterprise network 304. Once authenticated, the CE 136 may use its second protocol adapter 216 (e.g., a SEA) to persistently represent the user and the user's browser 308 to the enterprise network 304 until the user logs off, closes the browser 308, or performs some other action that indicates the desire to discontinue the registration of the user with the enterprise network 304.

Once the user has completed registration, that user has their identity and the address (e.g. IP Address) of the browser 308 bound to a known identity in the enterprise network 304. Accordingly, when the user initiates a call via the browser 308 or receives a call directed toward their identity (e.g., AoR), the enterprise network 304 is configured to begin processing the call-initiation message (e.g., INVITE) in accordance with communication preferences of the user.

The method continues with the processing of a request to initiate a communication session at the CE 136 (step 524). The request to initiate a communication session may be received from the browser 308 as a WebRTC message (e.g., make_call operation) or the request may be received from the enterprise network 304 (e.g., as an INVITE message). In some embodiments, registration of a user as discussed above in connection with steps 504, 508, 512, 516, and 520 can occur simultaneously with, before, or after the receipt of a call originating from or directed toward a browser 308. Accordingly, although step 524 is shown as occurring after registration, it should be appreciated that a communication session between the browser 308 and CE 136 is set up at registration time, not after a request to make a call. Furthermore, the CE JavaScript library 188 may correspond to the entity that directly handles the communication session (like SIP stack) rather than serving as a lookup for the browser.

Regardless of when the session is initiated, the browser 308 may obtain information from the web application 184 to facilitate a WebRTC communication session with the CE 136 (step 528). This information obtained at the browser 308 may correspond to information already contained in the JavaScript 312, CE API 316, and/or WebRTC API 320 or it may correspond to additional script information obtained from the JavaScript library 188 of the web server 184. Additionally or alternatively, the CE JavaScript library 188 may correspond to the entity that directly handles the communication session, much like a SIP stack, rather than serving as a lookup for the browser 308. This information is used by the browser 308 or the CE JavaScript library 188 itself to establish a connection with the WebRTC gateway 212 (step 532).

When the CE 136 determines that the browser 308 has connected thereto via the WebRTC gateway 212, the method continues with the CE 136 presenting the browser 308 to the enterprise network 304 as an enterprise user communicating on an enterprise communication device (step 536). In other words, the CE 136 presents the browser 308 and its user to the enterprise network 304 in such a way that the network 304 is unaware that the browser 308 is communicating via WebRTC. Instead, the network 304 is allowed to utilize native protocols (e.g., SIP, H.323, etc.) and the user operating the browser 308 is treated as if he/she were using a SIP or H.323-enabled communication device. Similarly, the applications 152 within the CE 136 view the browser 308 as an endpoint and have no regard for the protocols being employed between the browser 308 and WebRTC gateway 212.

Figure 6:
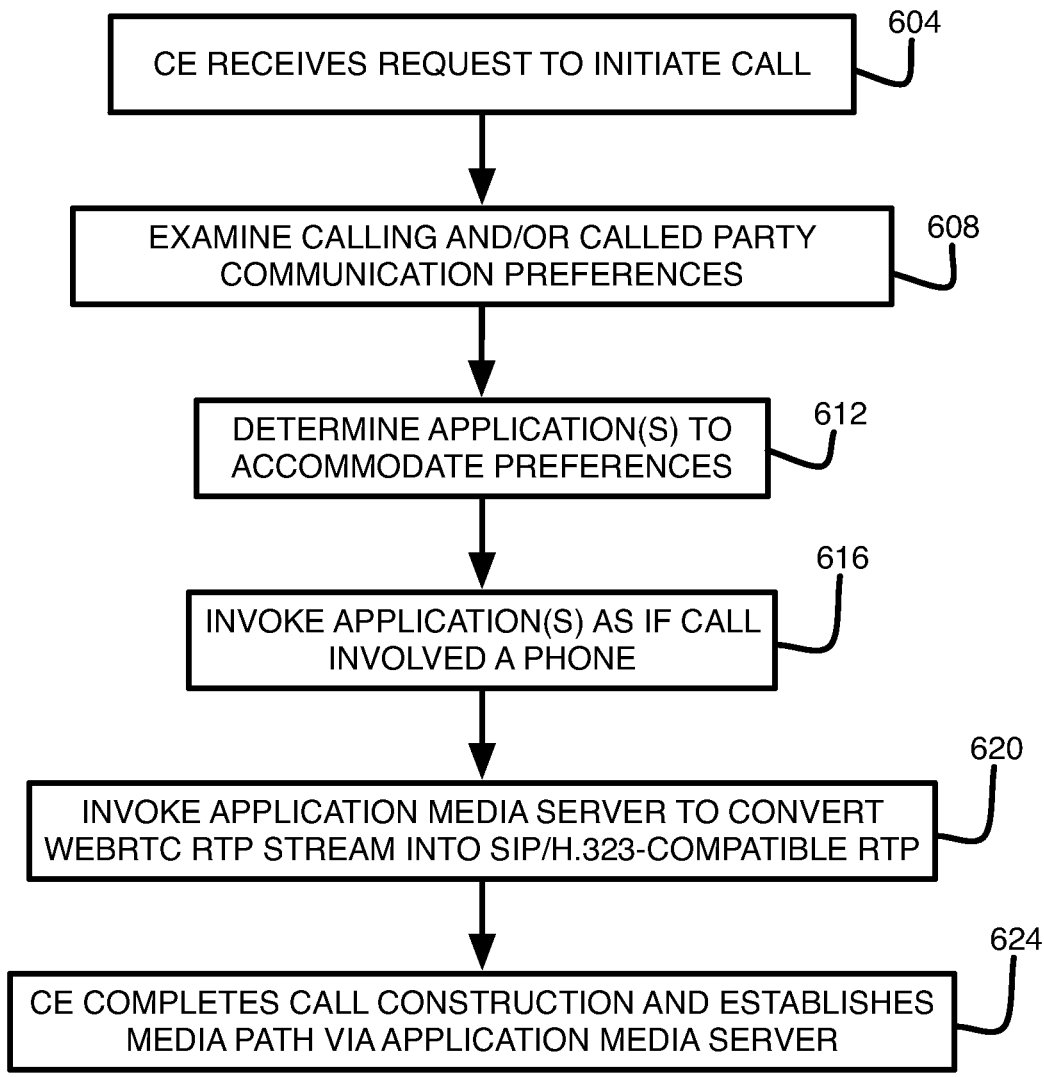
FIG. 6 is a flow diagram depicting a second communication method in accordance with embodiments of the present disclosure.

FIG. 6 depicts the communication method as viewed from the CE 136. The method is initiated when the CE 136 receives the request from a web application 184 to initiate or "make" a call (step 604). Thereafter, the CE 136 and/or communications server 128 examines the call request or signaling received from the browser 308 to determine communication preferences for the calling and/or called party (step 608). In some embodiments, the analysis may be performed based on the user that previously registered with the CE 136 via the browser 308 (e.g., analyzing calling preferences of a user that registered the browser 308 with the CE 136).

Based on the analysis of step 608, one or more enterprise applications 152 are selected for incorporation into the communication session (step 612). The CE 136 is capable of invoking such applications 152 internally and/or via the enterprise network 304 as if the call was originated by a phone (step 616). Thus, the applications 152 can be developed for SIP and/or H.323, but still be used in a WebRTC call.

The CE 136 may further invoke the application media server 156 to convert the WebRTC stream into SIP/H.323-compatible RTP (step 620). It should be noted, however, that the application media server 156 is not necessary for simple calls in the native mode of operation although it could still be used for features such as playing announcements and the like. If and when the application media server 156 has been invoked, the CE 136 completes the call construction by sequencing any additional applications and establishing a media path via the application media server 156 (step 624). At this point, the communication session is established between the browser 308 (or specifically the client 112 using the browser 308) and another device, which may be another browser 308 or a communication device 160.

Figure 7:
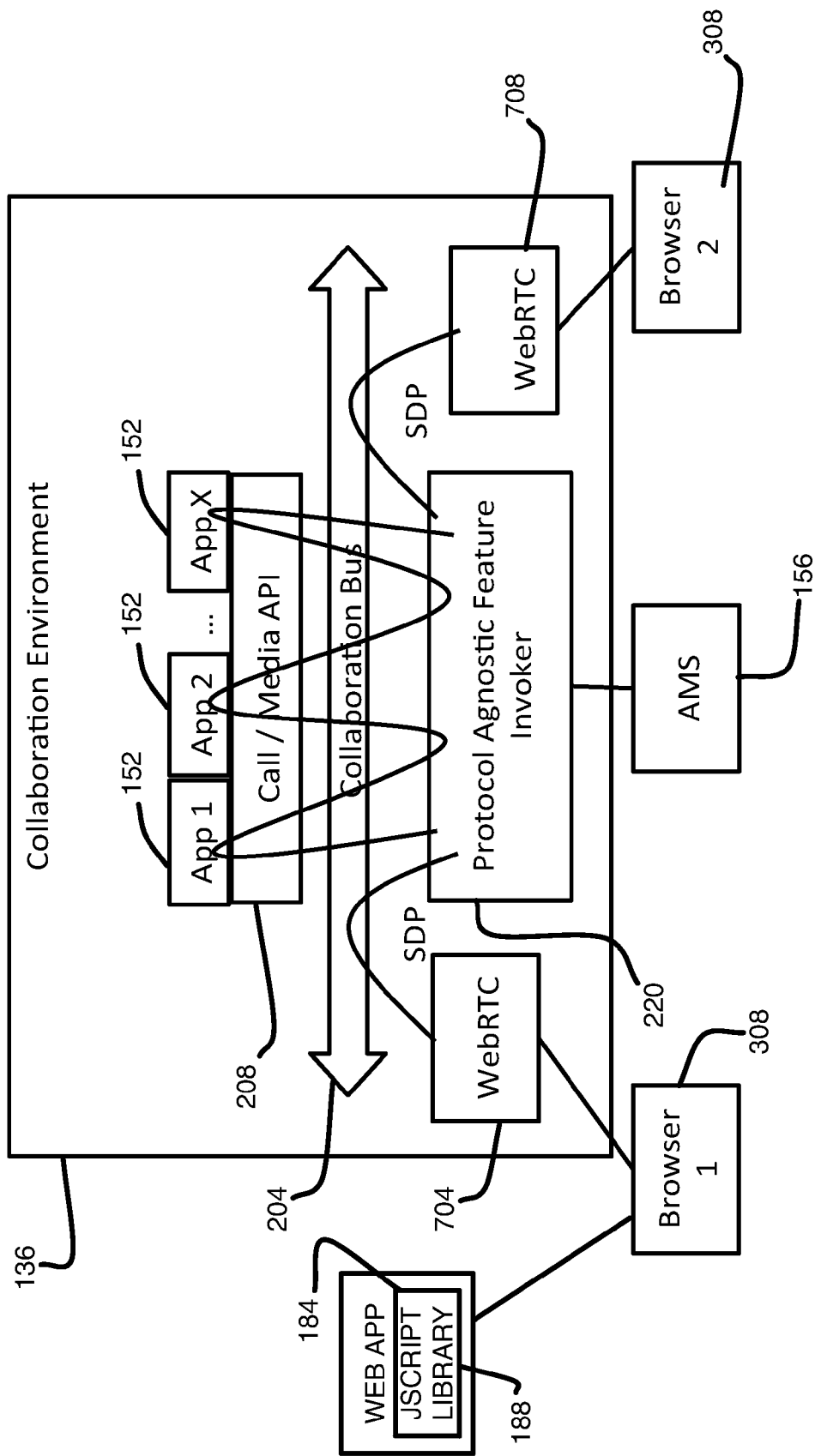
FIG. 7 is a block diagram depicting a third communication system configuration in accordance with embodiments of the present disclosure.
Figure 8:
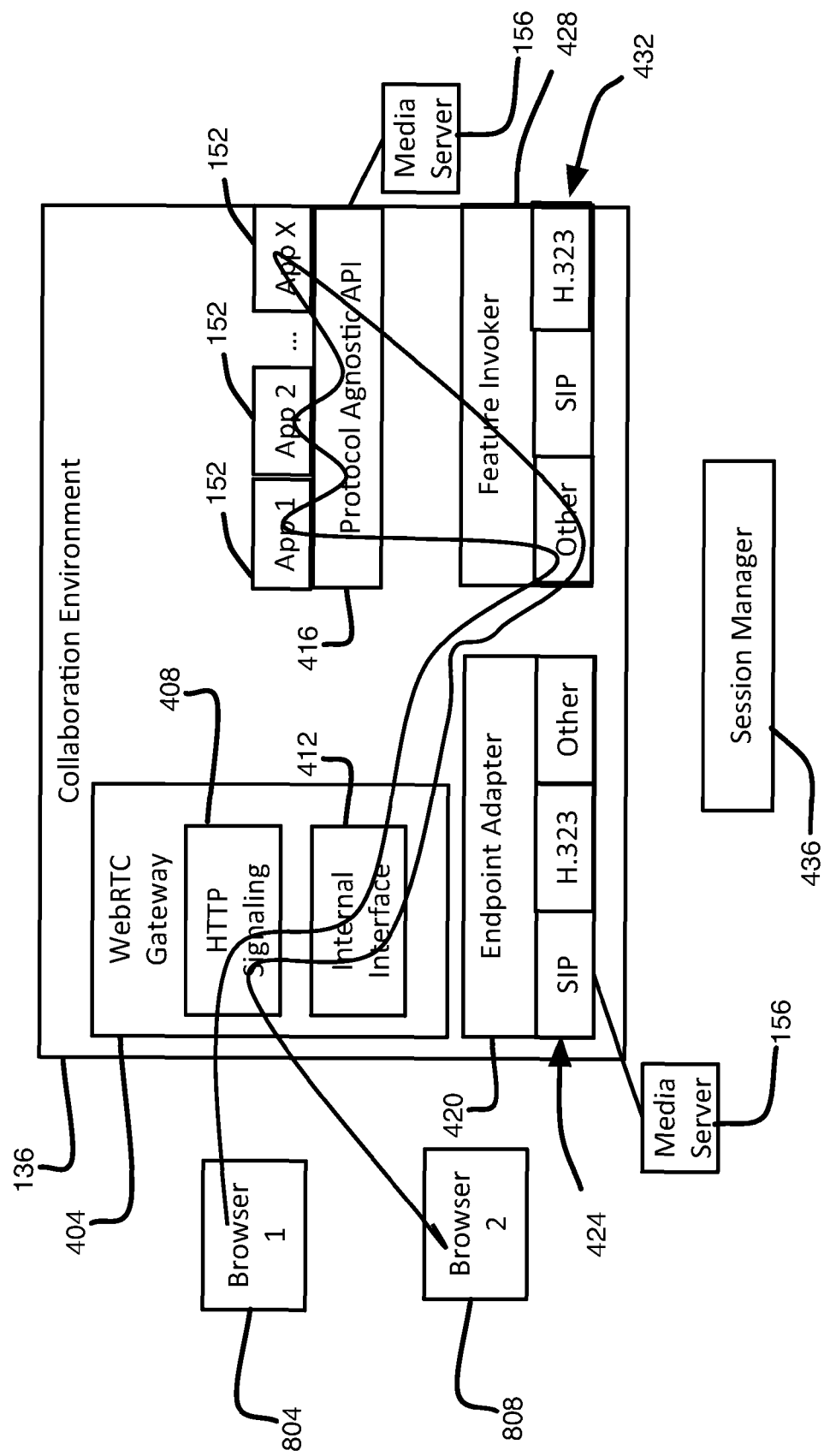
FIG. 8 is a block diagram depicting a fourth communication system configuration in accordance with embodiments of the present disclosure.
Figure 9:
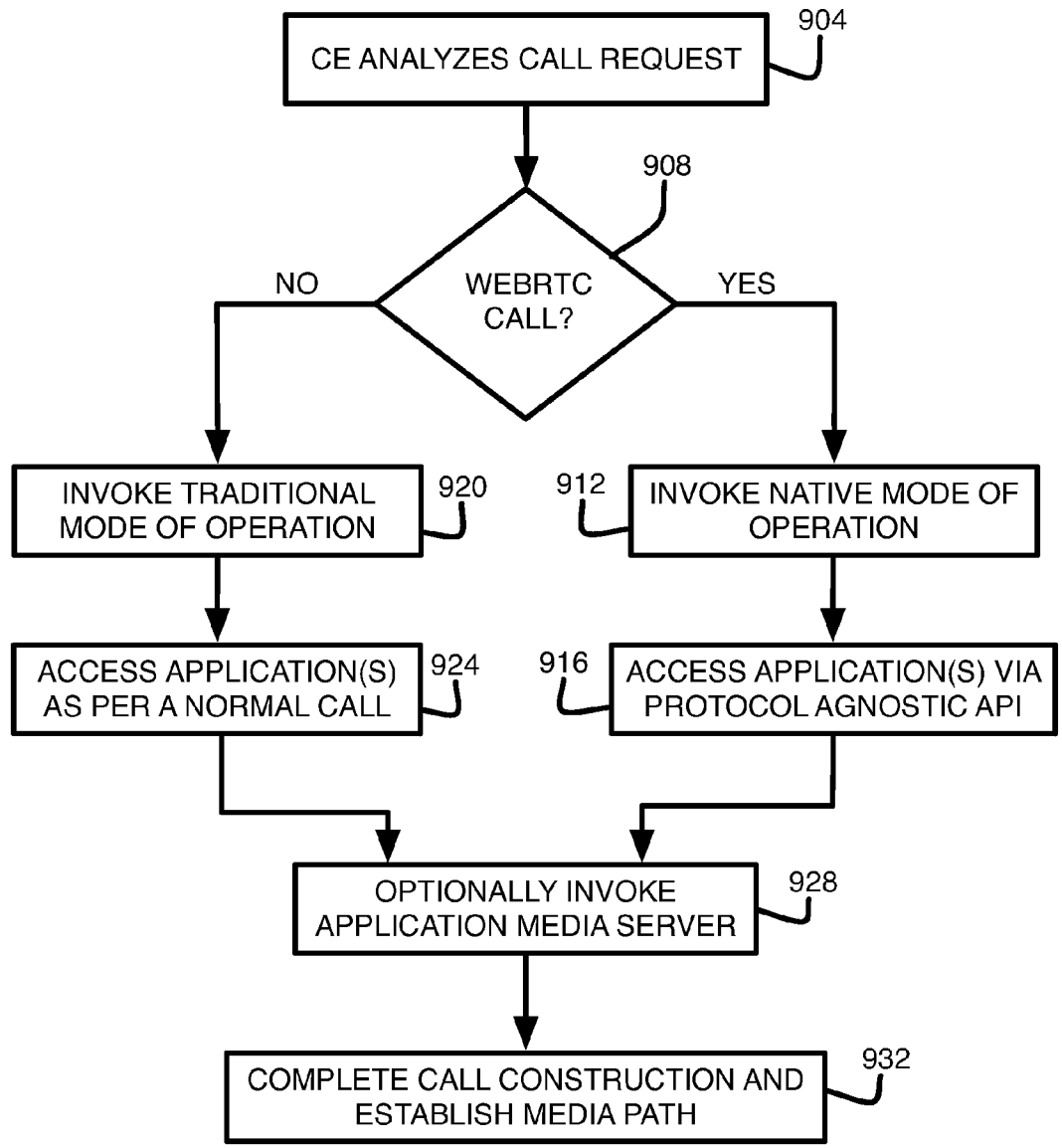
FIG. 9 is a flow diagram depicting a third communication method in accordance with embodiments of the present disclosure.

With reference now to FIGS. 7-9, additional details of the CE's 136 ability to operate in a native mode will be described in accordance with at least some embodiments of the present disclosure. Specifically, FIG. 7 depicts an architecture similar to FIGS. 2 and 3 where the protocol adapters 212, 216 are both WebRTC gateways 704, 708. The WebRTC gateways 704, 708 are used to facilitate a browser-to-browser communication session. The browsers involved in the communication session may be internal browsers 168, external browsers 116, or a combination thereof. In some embodiments, because the communication session solely involves browsers 308, the CE 136 is enabled to operate in a native mode of operation. In other words, the CE 136 does not have to utilize a SEA to present a browser to an enterprise communication network. Instead, processing of the communication session and application sequencing may occur entirely within the boundaries of the CE 136. In other words, the protocol agnostic feature invoker 220 may solely invoke native applications 152 via the call/media API 208.

FIG. 8 depicts an analogous architecture to that of FIG. 4. Again, the CE 136 is facilitating a browser-to-browser communication session between browsers 704, 708, which may be similar or identical to the browsers 308 depicted and described in FIG. 7. While operating in this native mode, the CE 136 is able to bypass the endpoint adapter 420 and all application sequencing and processing occurs internal to the CE 136. Thus, only internal applications 152 are invoked in a protocol-agnostic fashion while the CE 136 is operating in a native mode. The session manager 436 and a connection to an enterprise network 304 are not required in this mode of operation.

With reference now to FIG. 9, a method of invoking a native or non-native mode of operation at the CE 136 will be described in accordance with embodiments of the present disclosure. The method begins after a browser 308 has registered with the CE 136 and when a make call request is received at the CE 136 (step 904). The CE 136 then analyzes the call request and determines whether the call request was made by a browser 308, directed to a browser 308, and/or or whether the call request came from or is directed to a traditional phone (e.g. SIP-enabled or H.323-enabled phone) (step 908). If the CE 136 determines that the call is going to include two browsers 308 (e.g., the call will not involve a legacy communication protocol such as SIP or H.323), then the CE 136 begins operating in a native mode of operation (step 912). While in the native mode of operation, the CE 136 uses its native interface (e.g., protocol agnostic feature invoker 220, call/media API 208, and/or feature invoker 428) to access the internal applications 152 in a protocol-agnostic fashion (step 916).

Referring back to step 908, if the call does not involve WebRTC, then the CE 136 will invoke the traditional mode of operation (step 920) and access the enterprise applications 152 as per a normal call (step 924).

Following step 916 or 924, the method continues with the CE 136 optionally invoking the application media server 156 (step 928) and completing the call construction so that a media path is established between the participant's communication endpoints, which may be browser-based, phones, or a combination thereof (step 932). As noted above, one or more of the applications 152 may have access to the media of the communication session via the application media server 156, but this is an optional step that does not necessarily have to be followed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
providing, by a collaboration environment, a protocol agnostic communications interface between a browser and one or more applications;
operating the collaboration environment supporting the protocol agnostic communications interface in a native mode wherein the one or more applications are contained within the collaboration environment or traditional mode, and wherein at least some of the one or more applications are external to the collaboration environment and operate native in a protocol other than the web-based communications protocol;
conducting, by the collaboration environment, a communication session with the browser using a web-based communications protocol; and
accessing, by a feature invoker of the collaboration environment during the communication session, the one or more applications, wherein the feature invoker invokes the one or more applications via a protocol agnostic call / media Application Programming Interface (API) to the one or more applications without exposing the one or more applications to the web-based communications protocol.

2. The method of claim 1, further comprising:
invoking the collaboration environment to operate in the native mode; and
in response to invoking the collaboration environment to operate in the native mode, sequencing one or more applications into the communication session.

3. The method of claim 1, further comprising:
invoking the collaboration environment to operate in the traditional mode; and
in response to invoking the collaboration environment to operate in the traditional mode, causing an enterprise communications network to sequence one or more applications into the communication session.

4. The method of claim 1, wherein the one or more applications are protocol agnostic.

5. The method of claim 1, wherein an application sequence is determined by the feature invoker contained within the collaboration environment.

6. The method of claim 1, wherein a determination is made to operate the collaboration environment in the native mode or the traditional mode on a call-by-call basis depending upon a type of endpoint detected as being involved in the communication session.

7. The method of claim 1, wherein the web-based communications protocol comprises a Web Realtime Communications (WebRTC) protocol.

8. The method of claim 1, wherein the one or more applications are not configured to support the web-based communications protocol.

9. The method of claim 1, wherein the one or more applications provide the browser with communication features including one or more rich unified communications operations selected from the following: call transfer, call forward, conference, join call, record call, and block call.

10. A non-transitory computer readable storage medium having stored thereon instructions that cause a computing system to execute a method, the instructions comprising:
instructions that provide, by a collaboration environment, a protocol agnostic communications interface between a browser and one or more applications;
instructions that operate the collaboration environment supporting the protocol agnostic communications interface in a native mode wherein the one or more applications are contained within the collaboration environment or traditional mode, and wherein at least some of the one or more applications are external to the collaboration environment and operate native in a protocol other than the web-based communications protocol;
instructions that conduct, by the collaboration environment, a communication session with the browser using a web-based communications protocol; and
instructions that access, by a feature invoker of the collaboration environment during the communication session, the one or more applications, wherein the feature invoker invokes the one or more applications via a protocol agnostic call/media Application Program Interface (API) to the one or more applications without exposing the one or more applications to the web-based communications protocol.

11. The computer readable storage medium of claim 9, wherein the instructions further comprise instructions configured to determine, on a call-by-call basis, whether to operate the collaboration environment supporting the protocol agnostic communications interface in the native mode or the traditional mode.

12. The computer readable storage medium of claim 10, wherein the instructions further comprise:
instructions configured to invoke the collaboration environment to operate in the native mode; and
instructions configured to sequence one or more applications into the communication session.

13. The computer readable storage medium of claim 10, wherein the instructions further comprise:
instructions configured to invoke the collaboration environment to operate in the traditional mode; and
instructions configured to cause an enterprise communications network to sequence one or more applications into the communication session.

14. The computer readable storage medium of claim 10, wherein the one or more applications are protocol agnostic.

15. The computer readable storage medium of claim 10, wherein an application sequence is determined by the feature invoker contained within the collaboration environment.

16. The computer readable storage medium of claim 9, wherein the web-based communications protocol comprises a Web Realtime Communications (WebRTC) protocol.

17. A communication network, comprising:
a collaboration environment including:
one or more applications;
a protocol agnostic communications interface between a browser and the one or more applications that conducts a communication session with the browser using a web-based communications protocol; and a feature invoker that accesses the one or more applications during the communication session access, to invoke the one or more applications via a protocol agnostic Call/media Application Programming Interface (API) without exposing the one or more applications to the web-based communications protocol, and operates in a native mode, wherein the one or more applications are contained within the collaboration environment or traditional mode, and wherein at least some of the one or more applications are external to the collaboration environment and operate native in a protocol other than the web-based communications protocol.

18. The network of claim 16, wherein an application sequence is determined by the feature invoker contained within the collaboration environment.

19. The network of claim 16, wherein the collaboration environment further comprises a collaboration bus and wherein the web-based communications protocol comprises a Web Realtime Communications (WebRTC) protocol.

* * * * *